United States Patent [19]

Eberle

[11] 4,119,137

[45] * Oct. 10, 1978

[54] AUTOMATED POST BURN STATION

[75] Inventor: William J. Eberle, Reading, Pa.

[73] Assignee: General Battery Corporation, Reading, Pa.

[*] Notice: The portion of the term of this patent subsequent to May 4, 1993, has been disclaimed.

[21] Appl. No.: 697,786

[22] Filed: Jun. 21, 1976

Related U.S. Application Data

[60] Continuation of Ser. No. 618,772, Oct. 2, 1975, Pat. No. 3,980,126, which is a continuation-in-part of Ser. No. 432,545, Jan. 11, 1974, Pat. No. 3,954,216, which is a continuation-in-part of Ser. No. 395,528, Sep. 10, 1973, Pat. No. 3,861,575, which is a division of Ser. No. 184,338, Sep. 28, 1971, abandoned.

[51] Int. Cl.$^2$ .................... B22D 25/04; B23K 3/02
[52] U.S. Cl. .................... 164/332; 164/DIG. 1; 228/47; 228/51; 228/58; 228/901
[58] Field of Search .................... 164/80, 96, 332, 334, 164/270, 271, DIG. 1; 228/25, 28, 51, 58, 901, 45, 47, 242; 266/76

[56] References Cited

U.S. PATENT DOCUMENTS

| | | | |
|---|---|---|---|
| 3,493,035 | 2/1970 | Tiegel et al. | 164/334 |
| 3,806,696 | 4/1974 | Young et a. | 219/137 |
| 3,908,739 | 9/1975 | Cushman | 164/80 |
| 3,909,300 | 9/1975 | Schenk et al. | 136/134 R |
| 3,954,216 | 5/1976 | Eberle | 228/51 |
| 3,980,126 | 9/1976 | Eberle | 164/271 |

*Primary Examiner*—Francis S. Husar
*Assistant Examiner*—Gus T. Hampilos
*Attorney, Agent, or Firm*—Benasutti Associates, Ltd.

[57] ABSTRACT

An automated apparatus for sequentially forming integrally fused battery terminals on a plurality of storage batteries is described wherein a head means having a mold means adjustably mounted thereon is automatically movable with respect to a vertical axis, and has slidably mounted thereon a burning means for automatically producing a variable-intensity flame for melting said battery elements to form said integrally fused battery terminal during a vertial stroke thereof. An automated post burn station is further described having a conveyor means for advancing batteries sequentially to said burning station and for aligning said batteries with respect to said station for the above described fusing process. A plurality of novel sensors incorporated into the automated post burn station facilitates the rapid, automatic processing of batteries, while providing a high degree of safety and reliability.

In alternate embodiments of the present invention, members may be welded together by indirect application of heat, as for welding internal battery posts for connecting groups of plates or terminal posts electrically, through the use of a plurality of heated elements simultaneously engaging posts to be welded together, and wherein the configuration of molten metal is controlled as the weld cools, by the use of a template. The elements are heated, preferably by application of open flame through a plurality of mixing systems for the fuel, with one system being provided for each element.

In both the indirect and direct heat applications relating to welding mechanisms for forming terminal posts for batteries, a novel molding means is described comprising a structural member composed of aluminum or other high heat transfer material, which is adapted to interchangeably engage an aluminum mold member which mates with the structural housing and which actually forms the voids in which the melting and casting processes take place. The mold members, which are also composed of aluminum or other high heat transfer material, are provided with a novel mold coating consisting essentially of aluminum oxide formed through an anodization process. This novel mold coating is disposed on the surfaces of the mold members which define the molding voids, and act as a thermal barrier to cause momentary delay of heat transfer from the melted terminal posts to the remainder of the mold members and their associated structural housings. This novel mold coating is described as having superior release characteristics, while facilitating the formation of high quality battery terminal posts.

21 Claims, 20 Drawing Figures

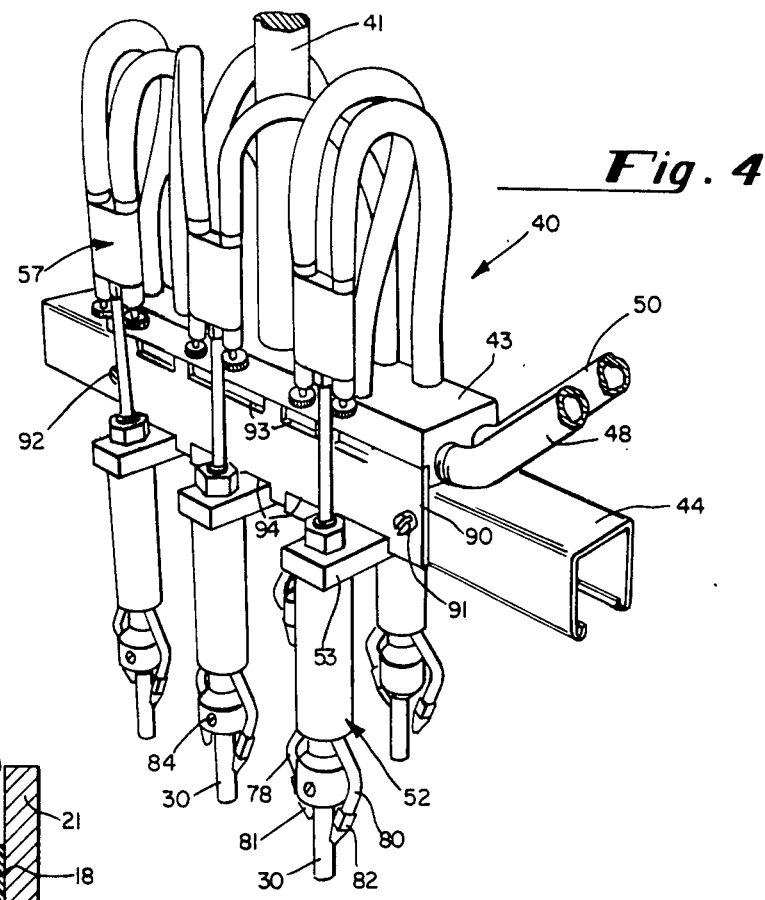
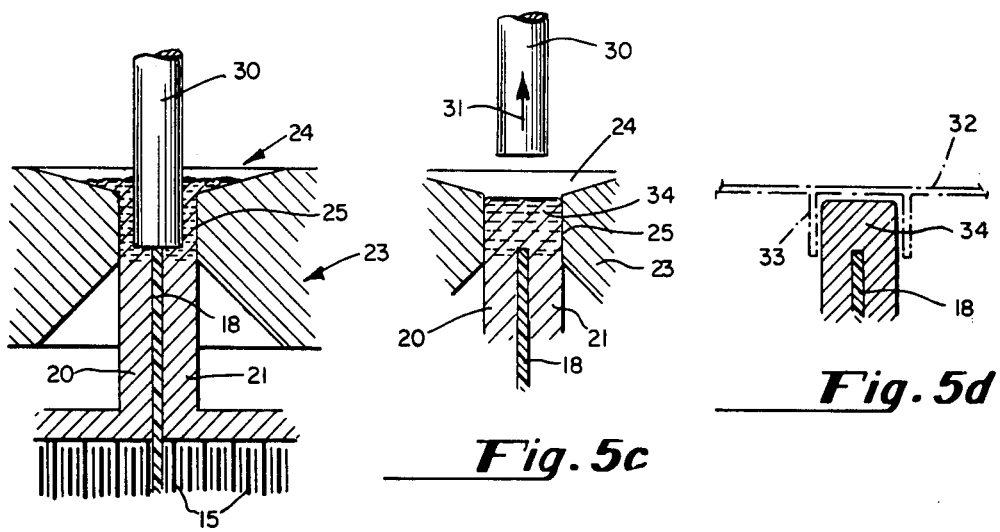

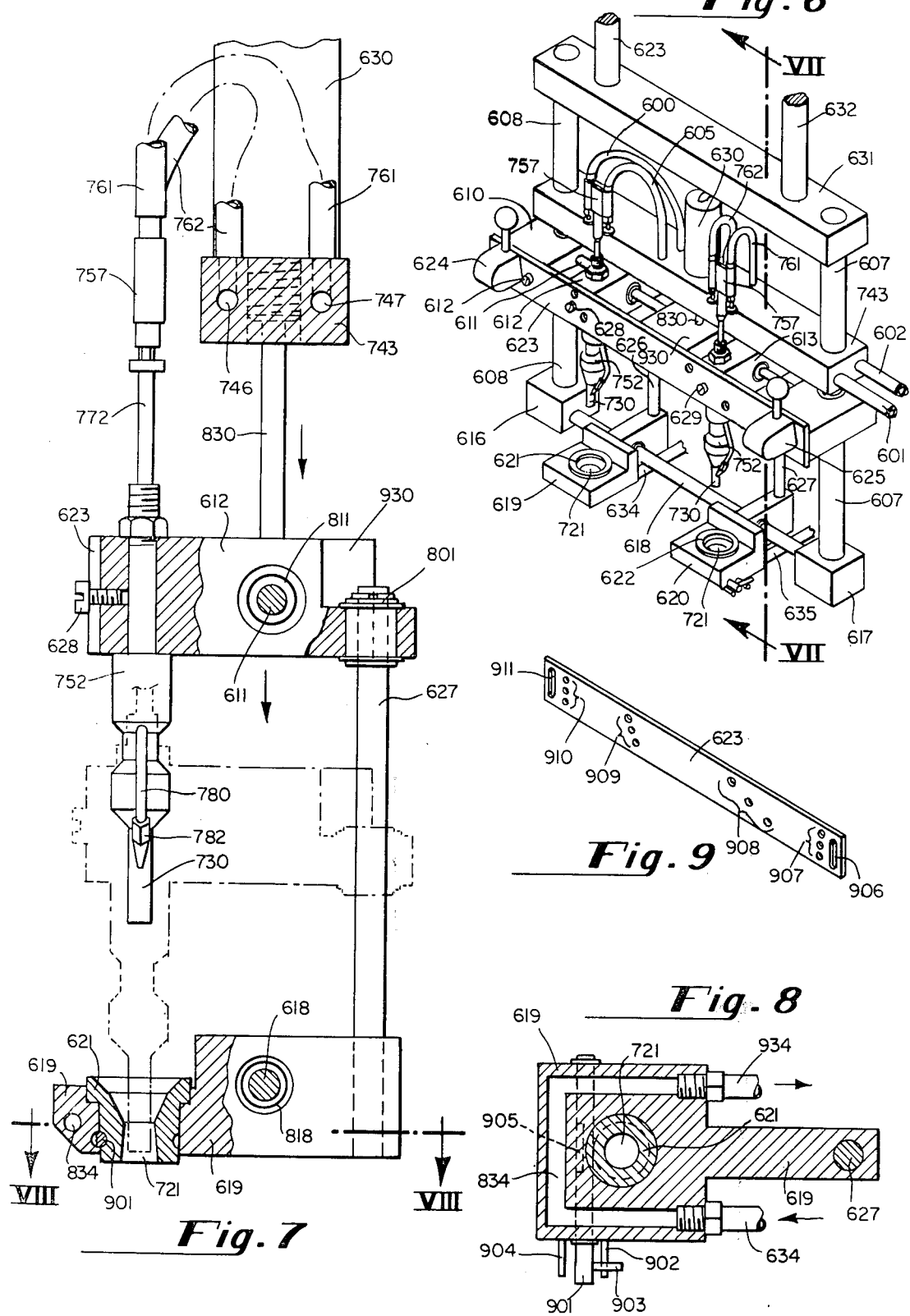

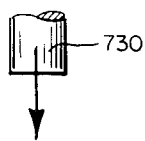
*Fig. 10a*
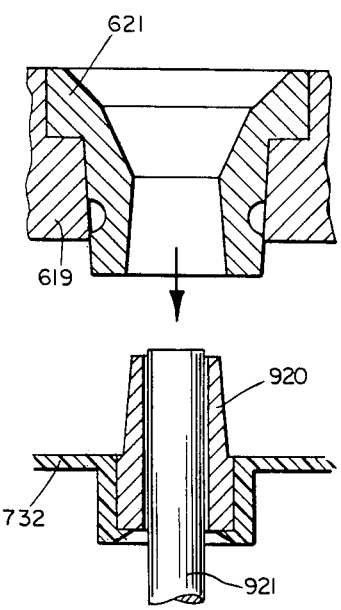
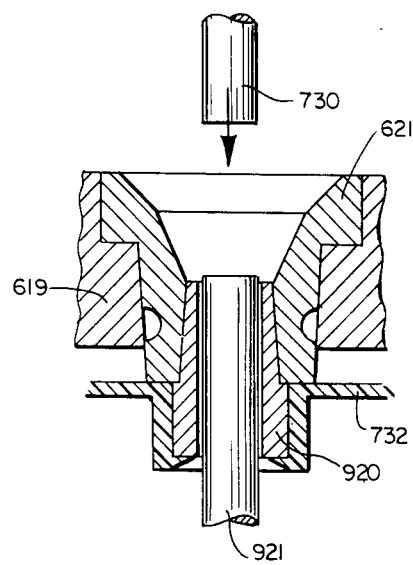
*Fig. 10b*
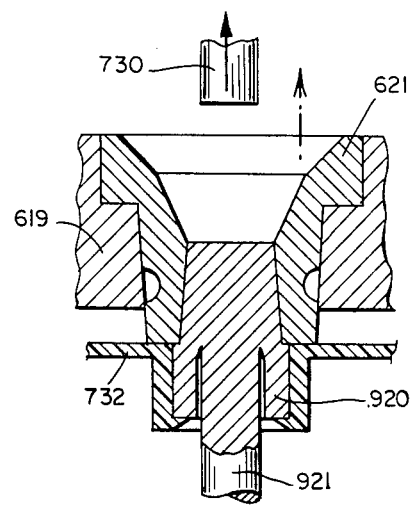
*Fig. 10d*
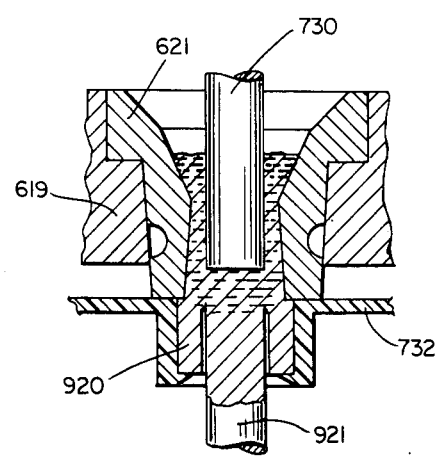
*Fig. 10c*

AUTOMATED POST BURN STATION

CROSS REFERENCE TO RELATED APPLICATIONS

This is a continuation of U.S. patent application Ser. No. 618772, now U.S. Pat. No. 3980126, filed Oct. 2, 1975, which is a continuation-in-part of my prior copending patent application Ser. No. 432,545, now U.S. Pat. No. 3,954,216 filed Jan. 11, 1974, entitled "Apparatus and Method for Thermal Relay Welding", which in turn is a continuation-in-part application of U.S. patent application Ser. No. 395,528, filed Sept. 10, 1973, now, U.S. Pat. No. 3,861,575 which in turn is a divisional application of U.S. application Ser. No. 184,338, filed Sept. 28, 1971, now abandoned which application are specifically incorporated by reference as if fully set forth herein.

The present application is also related to my prior copending application Ser. No. 423,317, filed Dec. 10, 1973, now U.S. Pat. No. 3,934,624 entitled "Acid Filling Apparatus for Batteries or the Like", as well as to my prior copending patent application Ser. No. 605,271, filed Aug. 18, 1975, entitled "Automatic Air Leak Testing Apparatus and Method for Multiple Chambered Containers Such As Batteries", which applications are also specifically incorporated by reference as if fully set forth herein.

BACKGROUND OF THE INVENTION

The present invention relates generally to the field of battery post forming and/or burning, and more particularly, to the field of burning battery posts with battery cover bushings for the purpose of forming an integrally fused battery terminal on the outer surface of the battery case. This invention, therefore, relates to welding in general, and specifically, for welding battery terminal posts, as for example, the type of battery terminals used in automobile batteries.

In the welding of various members together, it is commonplace to use a welding rod having flux therein, for many types of welding, such as arc welding. In other instances, particularly when the materials being welded together are soft, such as those comprising pot metal, lead, lead alloys, or like materials, welding may be effected by application of open flame to members that are to be welded together. In many instances, such techniques are highly desired and quite meritorious, however, in some instances, as for example, when electrical conductivity is desired, it becomes paramount that the connection between members being welded be such as to create minimal electrical resistance.

In the manufacture of electric storage batteries, such as the lead acid batteries normally used in automobiles, groups of battery plates and separators contained in separate cells in a battery case are placed in the case, after which time the various cells are joined in any of a number of ways to form intercellular connections therebetween. At the end of the storage battery, slender battery posts which will form the positive and negative terminals of the battery extend above the upper surface of the open battery case. These battery cases, which are normally composed of polypropylene or other plastic material, are adapted to receive thereon a polypropylene battery cover, which has formed therein two lead bushings adapted to be pierced by the battery posts when the cover is fitted onto the top of the case. A liquid-tight seal is then formed between the battery case and battery cover, either by gluing, ultrasonic welding, or by heat sealing means, and the final mechanical assembly is completed by fusing the battery post elements with the battery cover bushing elements to produce the desired positive and negative battery terminals.

Following the burning of the battery bushing elements and battery post elements to form positive and negative terminals on the battery, acid filling, forming, and other operations, may be conducted in order to produce a finished battery. Consequently, the burning process for forming integral, leak-proof battery terminals is only one step in the assembly of the complete electric storage battery.

The present invention also relates to the art of producing intercellular connections between pluralities of cells within a battery. In each cell, there are disposed a plurality of parallel but spaced plates, each having a lug extending therefrom, with various lugs being interconnected by a battery strap, by any suitable means, such as that disclosed in U.S. Pat. No. 3,395,748. Extending from a strap of this type, which connects plates of a given cell, is a post. Adjacent cells in a given battery are separated by cell partitions. Posts or groups of plates and adjacent cells must be connected for electrical conductivity between the cells. Accordingly, it is also this connection of adjacent battery cell posts that is of interest in this application.

Because of the presence of the cell partition between the posts, the posts are somewhat spaced at their upper end, in that the posts extend generally upwardly above the height of the cell partitions, such upward extension or protrusion facilitating the application of heat thereto, for obtaining an electrical connection between the posts across the upper end of an associated plate. Because the necessity of obtaining good electrical conductivity across such post connections, the art of welding battery posts has become highly developed, with individuals for performing the same having developed a high degree of skill with respect thereto.

In welding battery posts, either during the fusing process with battery cover bushing elements or with adjacent posts, it is possible to use a gas-oxygen torch or the like, of an intensity which will permit the delivery of sufficiently high temperature to the elements to be joined, while at the same time preventing the material at the upper end of the posts closest to the flame from reaching excessive temperatures, such that early metal flow from the upper ends of the posts commences, such flow continuing down into the space between the posts and bushings and/or between the two posts above the separator plates, and solidifying there, before lower ends of the posts in the vicinity of the upper end of the separator plate and/or at the base of the bushings have become sufficiently heated, thereby resulting in an incomplete fusion of metal at a location corresponding to the base of the battery terminal to be formed and/or at the upper edge of the cell partition. Thus, the result is that while a good fusion may exist at the upper end of the weld, often, at the lowermost ends of the weld the fusion is imperfect, with insufficient bond to provide sufficiently low electrical resistance as a connector. In order to avoid this, an operator may play the torch between the various elements to be welded, however, particularly in the case of the polypropylene battery cover, it is not possible to hold the torch in close proximity to that battery cover for fear that the battery cover will become scorched or damaged around its junction with the bushing. Accordingly, the results of welding battery terminals often results in variations or lack of uniformity in weldments, depending upon the particular operator or welder involved, as well as resulting in an undesirable percentage of rejects due to welds that have a sufficiently good external appearance to pass customary quality controls, but which are really poor weldments. Furthermore, since the appearance of battery terminals, unlike intercellular connections, are available for visual inspection by the intended consumer, even if a weld of high electrical integrity is formed by the process, the battery is likely to be rejected if the resulting battery terminal lacks a solid, uniform appearance.

SUMMARY OF THE INVENTION

The present invention is directed towards overcoming the above and other difficulties in connection with the welding of battery terminal posts, as well as with welding in general, by providing a novel method and apparatus whereby adjacent members, such as battery terminal posts and battery cover bushings, may be welded. In the preferred embodiment of the present invention an apparatus is provided comprising a head means, movable along the vertical axis, having mounted thereon a mold means which is adapted to matably encircle the battery bushing element and battery post element to be fused, and to act as a mold when the head means is in it molding along that axis. A burning means capable of producing a variable intensity flame for preheating, melting and post warming said battery elements is mounted in slidable engagement on said head means. The heat which is applied thereby is automatically modulated not only by the proximity of the burning means as it moves towards and away from the battery elements to be melted, but also by a preselected variation of the intensity of the flame produced by the burning means, which variation is produced as the burning means moves between the pilot and the burning position. The novel flame regulation of the preferred embodiment of the present invention is accomplished through the use of a fixed trip member mounted on the head means, which cams with a lever means which is adapted to regulate the gas flow of the burner. Consequently, by reason of movement and the variable flame intensity described above, applicant has provided modulated heat application which produces an extremely uniform battery terminal.

Accordingly, a primary object of the present invention is the provision of a battery post burn station which is fully automated. To this end, a novel conveyor means is also provided which is adapted to sequentially store and move batteries from a first hold position to a second operating position. This conveyor means further provides clamp means for transversely forcing each of said batteries into a battery element fusing position with respect to the vertical axis of travel of said burning means and said mold means. A feed sensing means is mounted on the apparatus for sensing the longitudinal advancement of a battery from the hold position towards the operating position, and for causing the stop means to move from the normal position which does not impede the longitudinal movement of batteries to the stop position wherein batteries are halted at said hold and operating positions. The feed sensing means further causes the movement of the clamp means from its retracted to its clamped position in timed response to the sensing of the longitudinal movement of batteries. An alignment sensing means then determines the movement of the clamp means to the fully clamped position, and causes a cylinder means to move a head means from its standby to its molding position, wherein molds which are adjustably mounted on the head means, matably encircle said battery elements to define a void therearound of the shape of the desired battery terminal. As the head means moves to the molding position, an abort means senses the lack of a battery in the battery fusing position, as might occur where a battery has been manually removed or where the apparatus has otherwise malfunctioned. This abort means then overrides the remaining portion of the operating cycle of the apparatus, preventing the flame from firing and causing the head means to return to the standby position and the stop means to move from the stopped to the normal position so that the next battery may be introduced into the apparatus.

Alternatively, battery sensing means are provided to determine the presence of a battery in the fusing position when the head means assumes the molding position, which battery sensing means causes a hydraulic cylinder to move the burning means from its pilot to a burning position. As described above, the burning means further comprises a lever means for contacting a trip member fixedly engaged on the head means, thereby automatically regulating the intensity of the flame from a minimum pilot flame when the burning means is in the pilot position to a maximum when the burning means is in the burn position. As a result, as the burning means moves towards the elements to be fused, the intensity of heat administered to those elements increases as the result of the proximity of the flame to those elements, and also by reason of the intensity of that flame. Upon movement of the burning means to the burning position, a travel sensing means determines the presence of said burning means in that burning position and causes the aforementioned hydraulic means to immediately begin moving the burning means back to said pilot position. The aforementioned trip member and lever means similarly respond to the retraction of the burning means by gradually reducing the intensity of the flame to its pilot condition. As a result of this novel burner action, the battery elements to be fused are preheated prior to melting, which preheating helps to eliminate the production of a cold joint such as might occur had the high intensity flame initially been directly applied to the cold battery elements. During the melting portion of the cycle, the high intensity flame is in close proximity to the elements, causing the complete melting thereof. Finally, as the torch carriage returns towards the pilot position, a post-heating phase of the cycle occurs which prevents the outer surfaces of the terminal from prematurely cooling, thereby creating a puddling effect on the top of the melted terminal which produces an even, uniform terminal. As a final result, the novel burning cycle of the present invention produces a fused joint which is extremely even and in which there is little or no layering or antimony precipitation.

Accordingly, one of the primary objects of the present invention is the provision of an electric storage battery post burner which produces a high quality, integral battery terminal. Another aim of the present invention is to provide a fully automated post burning station which rapidly and reliably processes batteries on which said terminals are to be formed.

An alternate embodiment of the present invention is intended to provide a novel method and apparatus whereby adjacent members, such as battery terminal bushings and battery terminal posts may be indirectly welded by the use of a solid heat sink which penetrates the members to be welded, as it liquifies the same, thereby carrying the temperature of welding through the zone to be welded, in order to achieve uniformity in welds, as well as for other purposes. Accordingly, it is a primary object of this embodiment of the present invention to provide a novel method for welding together members that are to be welded, preferably by indirect application of heat thereto.

It is a further object of this invention to provide a novel method and apparatus for welding together battery terminal posts and battery cover bushings, together with means for molding the posts to desired configurations during solidification thereof after the welding has been effected.

Another aim of the present invention is to provide a novel mold coating for use with the molding means of the present invention, which molding means allows for the formation of a uniform, integral battery terminal post.

Further objects of this invention reside in the construction and particularly novel welding apparatus, more fully described hereinafter. Other objects and advantages of the present invention, such as apparatus and method particularly directed towards the welding of battery terminal posts, will be readily apparent, as will objects of a generally broader nature, from a reading of the following brief description of the drawings, detailed description of the preferred embodiment, and the appended claims.

BRIEF DESCRIPTION OF THE DRAWINGS

FIG. 4 is a perspective view of some of the welding apparatus illustrated in FIG. 1;

FIG. 5a is a fragmentary view of a pair of upstanding battery posts with a cell partition between adjacent battery cells being disposed therebetween;

FIG. 5b is a fragmentary view of the pair of adjacent battery posts of FIG. 5a, with a template disposed thereover, and with a welding element received within the template, at the lower end of its stroke of penetration of liquified post portions;

FIG. 5c is a fragmentary view of portions of the illustration of FIG. 5b, at a later stage, after withdrawal of a welding element from the void in the template in which the liquid mass will be molded into solid form;

FIG. 5d is a fragmentary transverse view of a completed weld of battery posts of adjacent cells, welded across a partition, and with a battery cover being fragmentally illustrated in phantom disposed thereover, in order to best illustrate the manner in which a cover may accurately fit over an accurate and uniform battery post welded in accordance with this invention;

FIG. 6 shows an assembled view of an alternate illustrative embodiment of the principles of the present invention which features flexibly adjustable locations for the heating elements and also a flexible template system;

FIG. 7 shows a cutaway of a portion of the FIG. 6 apparatus;

FIG. 8 shows in cutaway a variable position template embodying the principles of the present invention;

FIG. 9 shows an overlaying plate to regulate the position of the heating elements, as desired;

FIGS. 10a through 10d show the operation of the apparatus of FIGS. 6 through 9 to secure terminal posts to bushings therefor;

DETAILED DESCRIPTION OF THE DRAWINGS

Figure 1:
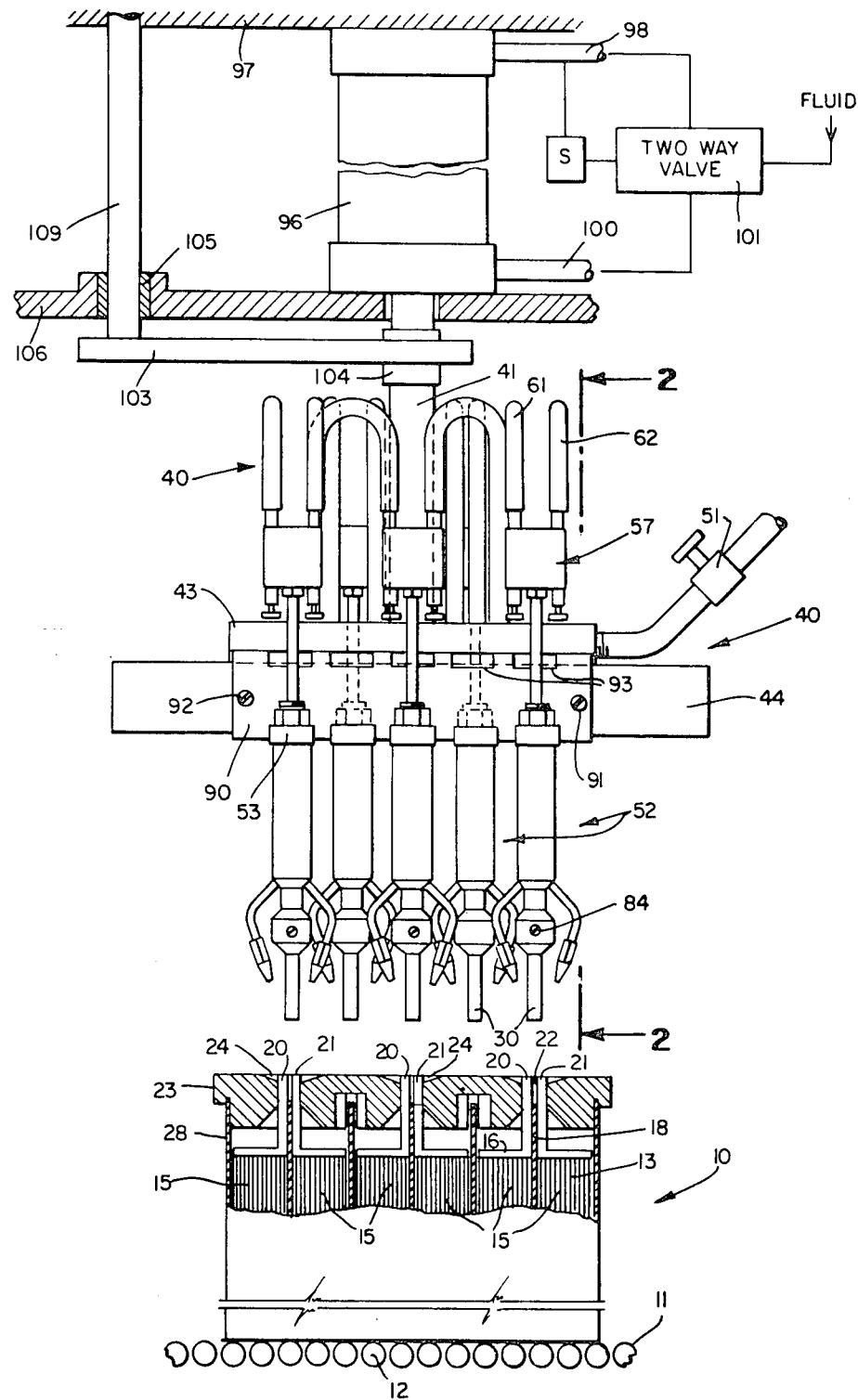
FIG. 1 is a side elevational view of an apparatus for welding battery terminal posts in accordance with an alternate embodiment of the present invention, showing this embodiment disposed above a battery that, in itself, is partially illustrated in section for clarity of illustration, with the battery being disposed on a conveyor.

Although specific forms of the invention have been selected for illustration in the drawings, and the following description is drawn in specific terms for the purpose of describing these forms of the invention, this description is not intended to limit the scope of the invention which is defined in the appended claims.

Referring now to the drawings in detail, reference is first made to FIG. 1, and particularly to the lower end thereof, wherein there is illustrated a battery, generally designated by the numeral 10, disposed upon a conveyor 11, having a plurality of transverse rollers 12 for movement of the battery 10 from left to right as viewed in FIG. 1, across the rollers 12.

A plurality of cells (six in number), such as those 13 and 14, are illustrated, in which are disposed a plurality of plates 15 extending downwardly from plate straps such as those 16 and 17, the plate straps 16 and 17 having been already connected to the plates 15, by any suitable means, such as that described in U.S. Pat. No. 3,395,748, or by any other means.

The cells 13 and 14 are separated by suitable cell partitions 18, constructed of an inert material, such as plastic or rubber (due to the presence of battery acid within the cells 13, 14, etc.). The partition 18 extends vertically upwardly between posts 20 and 21 of adjacent cells 14 and 13, respectively, with the partition 18 terminating at its upper end short of the upper ends of the posts 20 and 21, leaving a space 22 therebetween.

It is this space 22 that, upon welding by the use of open flame being applied to posts 20 and 21, may become filled with molten or liquid lead (or other post material) from the upper ends of the posts 20 and 21, and flow downwardly to solidify in the space 22 just above the separator plate 18, without application of a proper amount of heat to those portions of the posts 20 and 21, below the upper ends thereof as illustrated in FIG. 5a, in the vicinity of the upper end of the cell partition 18.

A template 23, constructed of some material (preferably metal) having a melting point substantially in excess of that of the material of the posts 20 and 21, is provided, on the battery, at the upper ends thereof, as illustrated in FIG. 1, with pairs of posts 20 and 21 extending upwardly through voids 24 therein. It will be clear that the voids 24 extend entirely through the template 23, and that the voids 24 comprise central portions 25 of a desired size and configuration corresponding to the posts, to easily receive and contain the same.

The upper and lower ends of the voids 24 are counter-sunk as at 26 and 27, to permit reception of posts 20 and 21 through the lower ends 27 of the voids 24, and to provide a dished portion 26 at the upper end of each void 24, to accommodate the reception of molten metal during the welding operation, with the lower countersink or cut-away portion 27 also facilitating the removal of the template 23 after the welding operation is complete, with the weldments solidified. It will further be noted that the template 23 is received on the upper lip of the casing 28 of the battery 10, as illustrated in FIG. 1.

With particular reference to FIGS. 5a, 5b and 5c, it will be seen that a heated element 30 that has been heated by means later to be described herein, to a temperature sufficient to melt the upper ends of posts 20 and 21 of adjacent battery cells, across the top of a partition 18, is lowered into engagement with the upper ends of the posts 20 and 21, and proceeds to melt the same, into a liquid state, and then to continue its downward movement, penetrating the liquid portions of the post members 20 and 21 being progressively melted as the element 30 moves downwardly, throughout a predetermined vertically downward stroke of movement of the element 30, such stroke also including a dwell time at the lower end thereof, as illustrated in FIG. 5b, if desired (but such dwell not being required), followed by retraction, or vertically upward movement of the element 30, in the direction of the arrow 31 illustrated in FIG. 5c, whereby the mass of liquid melt displaced into the zone 26 of the templet 23 during that portion of the operation illustrated in FIG. 5b, is free to fill the zone 25 of the void 24 of the templet 23, above the upper end of the partition 18, as illustrated in FIG. 5c, for cooling and solidification of the melt in the zone 25. It will be noted that a plurality (five in number) of such elements 30 may be utilized simultaneously, in order to simultaneously effect five different welds, between posts of adjacent battery cells, or in fact any desired number of such weldments may be effected, for battery cells, or for any other purpose, by the above-mentioned method of maintaining a constant temperature for the element 30 and delivering such temperature completely throughout the zone of the posts 20 and 21, or other members, in which the weldment is desired.

Furthermore, it will be noted that the voids 24, and particularly the central portions 25 thereof, comprise molds for the welds, during solidification and cooling thereof. After the welds are solidified, the templet 23 may be removed from the casing 28 of the battery 10, for reuse, as desired.

With particular reference to FIG. 5d, it will be apparent that a battery cover 32, having an annular cylindrical protrusion 33, for each pair of battery posts welded together, may be disposed over the upper end of the battery, with each weld 34 being received within a corresponding annular protrusion 33, for purpose of aligning the battery cover 32, if desired, and for facilitating the covering of the welds 34 and retention of the cover 32 on the battery 10.

It will further be noted that the welds 34 are simultaneously effected, for a given battery, and are all uniform, as regards their electrical qualities, and as regards their general height and other physical characteristics. Particularly as regards the height of the same, it will be noted that, all being of the same general height, the battery cover 32 will more easily fit thereover, with posts having welds 34 at the upper ends thereof, all being uniformly received in uniformly sized annular protrusions 33 of the covers 32.

Referring now to the welding apparatus of this invention specifically illustrated in FIGS. 1 through 4, it will be seen that an apparatus 40 is presented, for carrying a plurality of heating elements or heat sinks 30 protruding outwardly (downwardly) from the lower end thereof.

Figure 2:
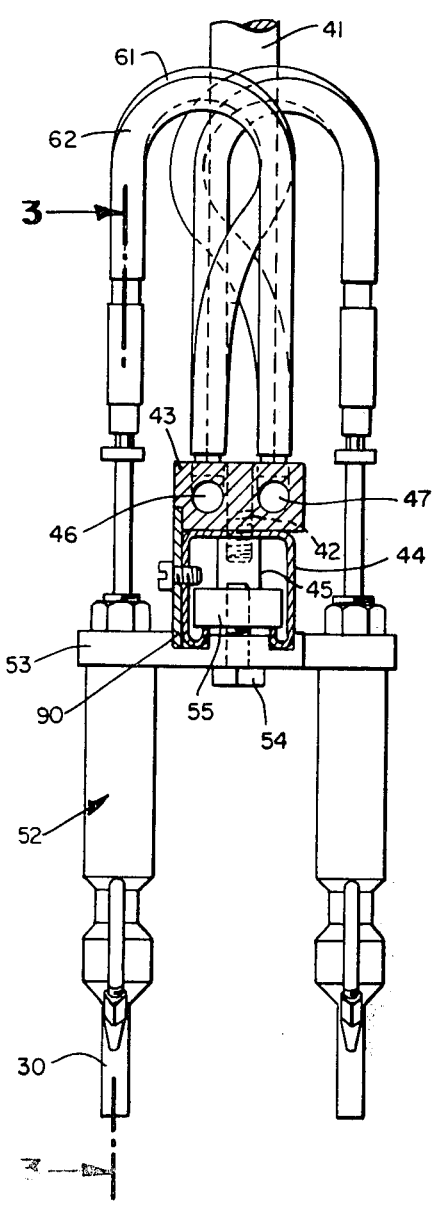
FIG. 2 is an enlarged fragmentary transverse view of a portion of the apparatus illustrated in FIG. 1, taken generally along the lines 2—2 of FIG. 1.
Figure 3:
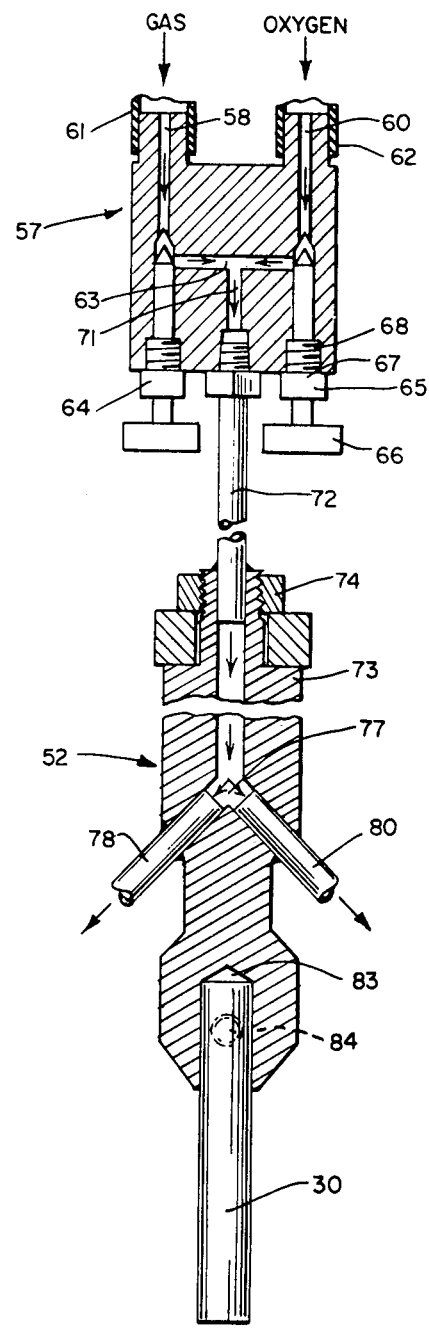
FIG. 3 is a further enlarged fragmentary sectional view, taken through one of the alternate embodiments of the heat applying devices of this invention, taken generally along the lines 3—3 of FIG. 2.

The apparatus 40 comprises a post 41 of cylindrical configuration, connected by any suitable means, such as threading or the like, as at 42, through a manifold head 43, and through a base member 44, to be secured by means of a nut 45 therebeneath. The base member 44 is of channel-like construction, being generally of inverted U-shape in transverse cross sectional configuration, as best illustrated in FIGS. 2 and 4. The manifold head 43 is secured to the upper end of the base 44, by any suitable means, such as screws or the like. The manifold head 43 is provided with a pair of conduits 46 and 47 extending longitudinally therethrough, each connected at one end to an associated gas distribution conduit 48 or 50, provided with associated on-off inlet valves 51, as desired. The conduits 48 and 50 are connected to suitable sources of gases, such as natural gas and oxygen, respectively, or any other gases that will facilitate and support combustion at the desired temperatures. Thus, acetylene gas may replace the natural gas if desired, as may a mixture of other gases, such as air, replace the oxygen, if desired.

The left-most end of each of the manifold channels 46 and 47 is closed, as blind conduits (not illustrated).

Five element heating means generally designated each by the numeral 52, are provided, each of substantially identical construction, so that only one need be described in detail, and each of which is carried at the lower end of the base member 44, by a suitable horizontal plate 53, secured by means of a cap headed screw 54 or the like extending therethrough, in engagement within a nut 55 disposed within the base 44. Thus, the position of any given element heating means 52 may be altered by loosening the screw 54, and repositioning such desired element heating means by moving the plate 53 longitudinally of the base member 44.

Each of the heating means 52 is constructed as an independent torch, being provided at its upper end with a mixing device 57, having upper inlets 58 and 60 for receiving, for example, gas and oxygen therein from respectively associated hoses 61 and 62 that, in turn, are respectively connected to associated manifold ducts 46 and 47, for supplying gas and oxygen to a chamber 63 disposed within the device 57, in which they are mixed.

Accordingly, the inlets 58 and 60 communicate respectively with the chamber 63. A pair of needle adjustments 64 and 65 are provided, associated with respective inlets 58 and 60, each comprising a thumb screw or the like 66, operative through a boss 67 in threaded engagement with the device 57 at 68, for adjusting the position of a needle 70 in the associated inlet, for regulating the amount of gas to be mixed with oxygen, and the converse. Upon arriving at a desirable gas-oxygen mixture, the mixture passes through the conduit 71, to discharge from the device 57, through a distribution line 72, that in turn is connected to an element holder 73, by suitable nuts 74 or the like in threaded engagement with threads 75, wherein the delivery lines 76 is bifurcated at 77, into a pair of delivery lines 78 and 80 that are inwardly bent at the lower ends, and have nozzles 81 and 82 respectively carried thereby, in the vicinity of the upper ends of the elements 30, for heating the elements at a location spaced above the lowermost, or free ends thereof. The elements 30 are contained within bores or recesses 83, by suitable screws 84, for ease of replacement.

Thus, the application of open flame due to the elimination of gas and oxygen from nozzles 81 and 82, to the elements 30, will heat the elements 30 as aforesaid. It will be noted that elements 30 may also be heated by induction heating (not illustrated), or by other suitable means, if desired. In any event, heat is built up and stored in the element 30, and in order to facilitate this end the element 30 may be constructed of a high temperature alloy, ceramic, or any other suitable material. It will be noted that the flame may continually be applied to the element 30 during the descent thereof and its retraction, as illustrated in FIGS. 5b and 5c, throughout its engagement with and projection into the material of the battery posts 20 and 21, if desired, or the heat may be applied to the elements 30 only when the same are in their uppermost or retracted positions, as desired. In any event, there will be a transfer of heat from the elements 30 to the upper ends of the battery posts 20 and 21, that will be constantly replenished by the application of heat to the elements 30, by virtue of the application of open flame thereto as described above, or by induction heating, or the like. Furthermore, it will be noted that the heating elements or tips 30 may take on various desired physical configurations and sizes, depending upon the particular application.

Another feature of this invention resides in the use of a plate 90 secured to the member 44, by a pair of screws such as 91 and 92, for ease of removal of the same, with the plate 90 having a plurality of openings, voids, notches or the like, disposed in a uppermost set 93, and a lowermost set 94. The lowermost set 94 is arranged to accommodate plates 53, in accordance with a desired predetermined spacing of element 30 relative to each other, as measured horizontally, and relative to posts 20 and 21 of a battery 10 to be welded therebeneath, and also relative to the templet 23 mounted on the battery 10 and disposed therebeneath. Accordingly, placement of the plates 53, in desired ones of the notches 94, will readily accurately position the elements 30, in accordance with the desired position for welding the posts of a given battery, for example. However, the assembly illustrated in FIG. 4 may readily accommodate an alternative placement of the elements 30, by merely removing the plate 90, and inverting the same such that the notches 93 are disposed downwardly, whereby another placement of the element 30 relative to each other may readily be effected quickly and economically, with minimum set-up time.

With particular reference to FIG. 1, it will be noted that the rod 41 is either mounted to, or comprises, the piston rod of a piston (not shown), disposed within a piston cylinder 96, mounted on suitable frame 97. The cylinder 96 is provided with suitable fluid inlets 98 and 100, respectively, for providing a downward driving force, for lowering the elements 30, or for retracting the same, depending upon the position of the two way valve 101. It will be noted that the fluid supplied through the lines 98 and 100 may be any desirable hydraulic, pneumatic fluid or the like, and that the piston within the cylinder 96 would be driven either upwardly or downwardly, depending upon the setting of the valve 101.

It will be noted that the stroke of the piston contained within the cylinder 96 is controlled to automatically re-set the valve, upon the piston disposed therein reaching the lower end of a predetermined stroke, in order that the elements 30 may be retracted prior to striking the separator plates or partitions 18. However, in the event of misalignment of elements 30 relative to posts 20, 21, or relative to the template 23, or relative to anything else wherein it is desired to prevent a striking of the same by the element 30, or even in the event that a battery 10 is raised, for example, at one end, due to the presence of a foreign item between the lower end of the battery and the conveyor rollers 12, such that the battery is "cocked", upon the striking of the elements 30 against any solid member, a sensor of pressure, force or the like 102, which is particularly responsive to pressure required to lower the piston contained within the cylinder 96, and consequently responsive to resistance to vertical downward movement that the elements 30 may meet, will be operative to actuate the valve 101, to cause an upward movement, or retraction of the assembly 40, and consequently of the elements 30 carried thereby, in order to prevent damage to the apparatus, or to batteries being welded.

Also, with reference to FIG. 1, it will be noted that the rod 41 is provided with a guide, comprising a plate 103 having a boss 104 disposed about the rod 41, and carried by the plate 103, and with a guide rod 109 being provided, mounted in a suitable bushing 105 carried by a plate 106, such that, upon downward movement of the rod 41, the same is guided against undesirable lateral movement, due to the presence of the guide plate and rod 103 and 109.

It will thus be seen that the apparatus of this invention is adapted toward accomplishing its desired ends, both in broad respects, and in specific respects, regarding the construction of multiple-cell lead-acid storage batteries.

It will further be noted that the particular inwardly bent orientations of the nozzles 81 and 82, present the application of heat to adjacent areas, thereby concentrating the heat on the elements 30 themselves. It will also be noted that the element 30 may be adjustable positioned vertically within the blind hole 83, by merely loosening the screw 84 and repositioning the element 30. Furthermore, in operation, a proper positioning of the battery can actuate a switch (not shown), that in turn will cause the piston within the cylinder 96 to be actuated, if desired.

In view of the above-discussed invention, it has been possible to cut down the time necessary for completing a weld from thirty seconds to four seconds. Accordingly, aside from accomplishing improved welds, both insofar as their physical appearance and construction is concerned, and insofar as improving the uniformity and electrical conductivity of the same is enabled, the overall economics of battery manufacture is greatly improved, due to the automation of what has previously been a manual function.

An additional advantage over prior techniques of battery post weldment is also made possible with weldments of this invention. Such resides in the formation of a homogeneous weldment of adjacent battery posts. Spectrographic analysis of battery posts welded by conventional application of gas and oxygen flame directly to the post results in a tendency toward concentration of antimony from the posts at or near the bond of the weld, apparently caused by more severe heat at such locations relative to less heat applied to other areas of the weld. In thermal relay welding as taught by the instant invention, spectrographic analysis will reveal similar grain structures throughout the weld, in that the entire post area is heated uniformly and therefore cools evenly, without causing an antimony precipitation that would result in an antimony concentration. Consequently, the possibility of electrolysis at the antimony interface that forms the junction of dissimilar metals upon use of the battery in an electrical circuit is avoided by this invention, along with any corrosion attendant thereto. Furthermore, the structural strength of the post weldment is better, because of the absence of substantial discontinuities that would be formed by such antimony precipitation.

The foregoing discussion has emphasized the structure of the heating elements and the apparatus whereby combustible gases are delivered for the heating thereof. FIGS. 6 through 9 show an alternate illustrative embodiment wherein the heating elements are integrated with the templates lowered over the battery to form molds for the foregoing heating and melting process of the terminal posts. Moreover, the embodiment of FIGS. 6 through 9 features the heating elements and the molds in an integral adjustable configuration such that batteries having widely disparate structural characteristics may be processed efficiently without requiring extensive overhaul of the processing mechanism.

In the following description, many elements are identical both in structure and in function to corresponding elements in the foregoing discussion. Many of these are numbered similarly to the identical corresponding element, but further including a prefixed "7". Thus, for example, heating elements 730 in FIGS. 6 and 7 correspond identically to the heating elements 30 in FIGS. 1 through 5d. Unless otherwise specified, these identical elements shall not be discussed in detail, but shall be assumed to be disclosed completely in the foregoing.

In FIG. 6, a welding mechanism is set up for forming two terminal posts for batteries. Thus, while the foregoing embodiment included six welding mechanisms for cell to cell relays in batteries, the embodiment of FIGS. 6 through 9 is configured only to form the positive and negative terminal posts. It is to be understood, however, that any desired number of heating elements might be included in order to fulfill the desired welding requirements for given batteries. Likewise, the embodiment of FIGS. 6 through 9 includes several features which enhance the adaptability and therefore the utility of thermal welding apparatus embodying the principles of the present invention.

In the figures, a pair of heating elements represented generally as 752 are affixed to a pair of mounting blocks 612 and 613, which in turn are slidably mounted on a transverse rod 611. This transversely movable mounting permits lateral adjustment of the heating elements 752 to accommodate batteries having terminal posts located at different points. The transverse rod 611 upon which the blocks 612 and 613 are mounted is terminated at either end by a pair of elements 609 and 610. Overlaying both of the mounting blocks 612 and 613 and affixed to the elements 609 and 610 is a plate 623 which affords control of the adjustability function and which shall be described in more detail hereinafter. Also mounted on the rod 611 is a fixed block 930 which is in turn connected to the piston 830 of a pneumatic or hydraulic cylinder 630. Together, the blocks 609, 610, 612, 613 and 930, with the rod 611 and the plate 623, form a "carriage" to which the heating elements 752 are attached, by means of which the heating elements may be moved vertically (such as shown in phantom in FIG. 7) and upon which the respective heating elements may be adjusted transversely.

The terminating blocks 609 and 610 of the carriage upon which the heating elements 752 are mounted are in turn slidably mounted on posts 607 and 608, respectively, by means of bearings, not shown. Thus, under the control of the cylinder 630 and piston 830, the carriage arrangement including the heating elements 752 is moved vertically on the posts 607 and 608 which are connected at their tops and bottoms, as shown, to elements 616, 617 and 631. Topmost element 631 in turn is mounted on posts 632 and 633, which constitute part of a structural frame for the mechanism.

Also fixedly mounted on the posts 607 and 608 is a manifold head 743 which defines conduits 746 and 747 fed by lines 601 and 602 with a combustible gas for flame heating of the heating elements 730. As in the foregoing embodiments, the gases pass through the conduits 746 and 747, through hoses 761 and 762 and into mixing devices 757, and thence downwardly into the heating means 752. As shown, only two sets of hoses connect the heating means 752 with the manifold head 743, but it is clear that any number, as desired, might similarly be connected. Also mounted on the manifold heads 743 is the cylinder 630 whereby the mounting carriage for the heating means 752 is movable.

An aspect of the embodiment of FIGS. 6 through 9 which exhibits substantial operational efficiency but which was not shown in detail in the foregoing embodiments is the inclusion of a pair of molds 619 and 620 which respectively are connected to the mounting blocks 612 and 613 for the heating means 752. The molds 619 and 620 are slidably mounted on a transverse post 618 through bearings such as 818 and are respectively mounted on shafts 626 and 627 which are slidably movable through the blocks 612 and 613. It may therefore be seen that the molds 619 and 620 are movable as a unit with the upper mounting carriage for the heating means 752 but furthermore are separately movable together by means of the sliding of shafts 626 and 627 through the mounting blocks 612 and 613.

The molds 619 and 620 advantageously constructed to provide superior operational efficiency, which in turn is enhanced by their adaptability to process batteries of variable size. This may be appreciated by consideration of the various cutaway views in FIGS. 7 and 8. The principal structural member of the molds 619 includes a hollow channel 834 which is fed and exhausted by a pair of lines 634 and 934. The channel 834 provides a circulation route for water or other similar cooling fluids to be passed through, and thereby to prevent damage due to the extreme amounts of heat applied by the heating elements 730 to make the molten terminal posts. Centrally located on the flat portion of the structural housing 619 is a mold member 621 which mates with the structural housing and which actually forms the voids in which the melting and casting process takes place. The mold members 621 and 622 fit into a hole through the structures 619 and 620 and are locked therein by means of a slotted key 901 which locks the mold member 621 in place when situated as shown in FIGS. 7 and 8, but which allows for removal of member 621 when rotated 180° because the slot 905 then clears the outer periphery of the member 621. Lever arm 903 on the key 901 limits the rotary motion of the key by cooperating with extension members 902 and 904.

The mold members 621 and 622 are configured as shown to define voids 721 having an upper portion which is countersunk. Thus, when the heating member 730 is lowered as shown in phantom in FIG. 7 to heat and melt the terminal posts as shown in FIGS. 10a through 10d the level of the molten metal rises up into the countersunk portion, but when the heating element 730 is removed, the level settles back into the lower portion of the void 721 to dry in the standard configuration of a terminal post. In accordance with standardized procedures, positive and negative terminals of batteries are of different dimension in order to facilitate proper connection with external apparatus. In order to accommodate the wishes of various customers, the mold members 621 and 622 may have different sized voids 721, and may be rearranged between the molds 619 and 620 as desired. Moreover, the molds 621 and 622 shown may be freely interchanged with other similar members of different inner-configuration to process battery elements of varying size and configuration, as desired.

FIG. 9 shows a view of the overlying plate 623 which is affixed in the carriage assembly to end blocks 609 and 610 by means of cam means 624 and 625, and which, when so situated, determines the lateral position of the heating means 752. More particularly, the securement means 624 and 625 fit through slots 906 and 911 in the plate 623 and screw or bolt into the terminating blocks 609 and 610. The face of the plate defines first and second sets of openings 907 and 910, and a plurality of sets of openings such as 908 and 909 extending across the face of the plate. Once the securement members 624 and 625 mount the plate onto the carriage assembly, set screws such as 912 through select ones of the end holes 907 and 910 establish the vertical location of the plate 623. Thereupon, a position is established for the support blocks 612 and 613 because they are affixed to the plate 623 by scres 628 and 629 through appropriate ones of the holes 908 and 909. Thus, use of particular ones of the holes 907 and 910 establish which of the holes 908 and 909 (or any other such sets of holes, as desired) to which the blocks 612 and 613 shall be mounted. It is to be understood that by alteration of the holes such as 908 and 909, any desired position of the heating means 752 on the shaft 611 may be established. Since the molding apparatus 619 and 620 is affixed to the respective blocks by means of posts 626 and 627, similar positioning is established for the molding apparatus 619 and 620 on the lower shaft 618. Likewise, in order to accommodate different numbers of heating means 752, it would only be required to establish correspondingly more sets of holes in the plate 623.

In a preferred mode of operation, the embodiment in FIGS. 6 through 9 operates as shown in FIGS. 10a through 10d. In FIGS. 10a through 10d, a bushing 920 is mounted around the post hole of the battery casing 732 as is practiced in the art. Thereupon, as the casing is assembled, a terminal post 921 fits into the metallic bushing, to be welded thereto by application of apparatus embodying the principles of the present invention. In order to prepare the machinery of FIGS. 6 through 9 for operation, the plate 623 first is adjusted as desired to locate the heating means and the molding means appropriately over batteries to be processed. Once a battery is positioned beneath the FIG. 6 apparatus by means of a conveyor or the like, not shown, the cylinder 630 and piston 830 are energized to lower the carriage assembly and the molding apparatus downwardly onto the battery as shown in FIG. 10a. The first portion to make contact with the battery includes the molding means, which seat as appropriate over the portion to be processed as shown in FIG. 10b. Thereupon, however, the cylinder 630 and piston 830 continues to exert downward force upon the carriage assembly, as shown in FIG. 10b, and a sliding of the carriage over the downward shafts 607, 608, 626, and 627 results, such as shown in phantom in FIG. 7. Once the heating means 752 are lowered to the desired position, as shown in FIG. 10c, the melting process of bushing 920 and post 921 as described hereinbefore is conducted, after which the heating means 752 first are withdrawn and sufficient time is allowed for the molten terminal post to set, as shown in FIG. 10d, and the entire assembly is then withdrawn upwardly.

It may therefore be seen that the principles of the present invention provide substantial flexibility, in that variable numbers of heating means 752 may be utilized, but all are freely adjustable in accordance with the established structure of the plate 623. By utilizing associated molding mechanisms, further adaptability is provided since, first, unitary mold mechanisms are not needed, and secondly, the interchangeable mold members 621 and 622 facilitate processes of different types.

Figure 11:
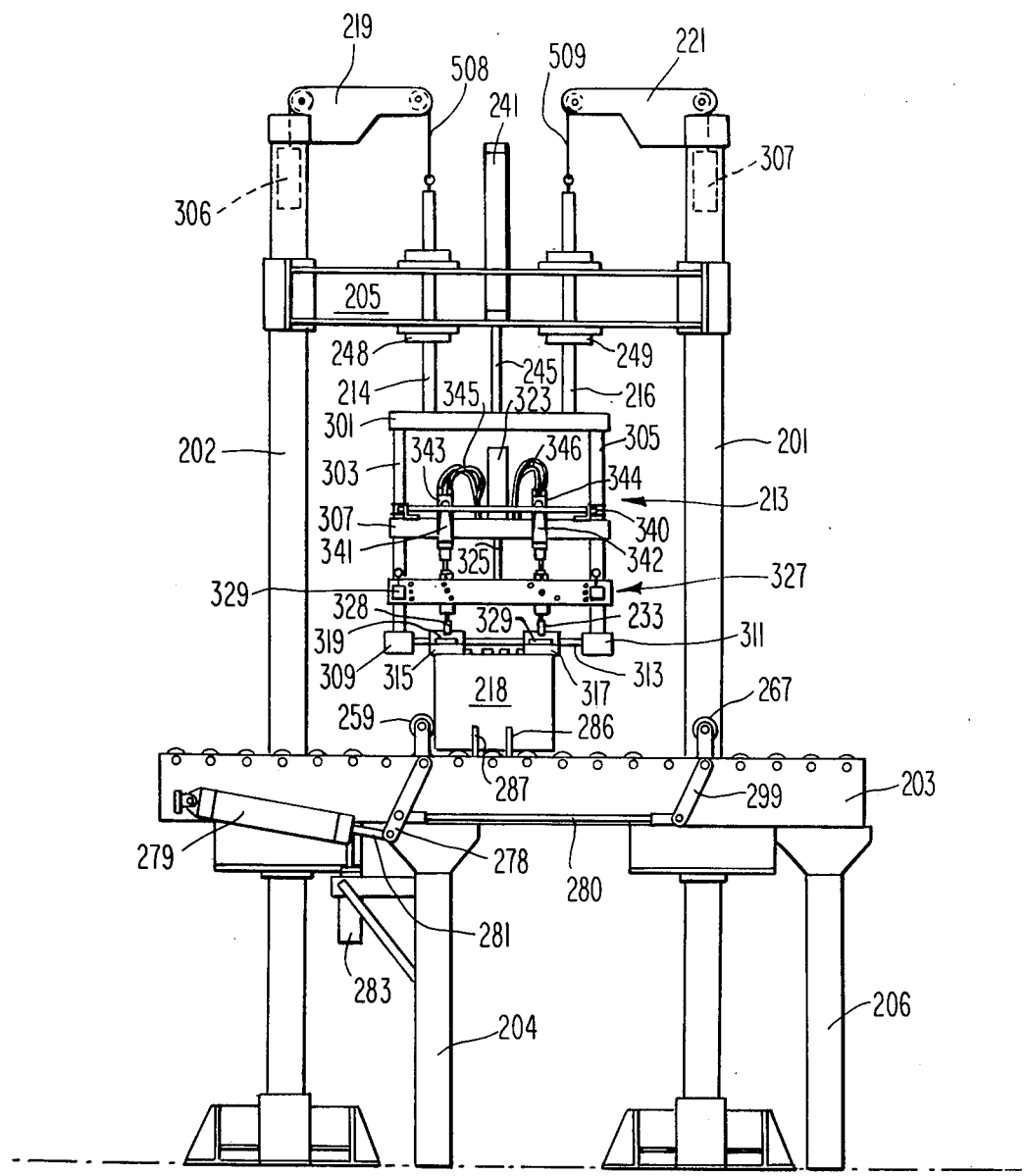
FIG. 11 is a front view of an apparatus for burning battery terminal posts and battery cover bushings in accordance with the preferred embodiment of the present invention.

It will also be noted that, while the invention is described and illustrated above, it is principally for use with multiple-terminal applications, the same may be used for single applications, regarding the welding of batteries, and with respect to other types of welding. The preferred embodiment of the present invention is illustrated in a front elevational view in FIG 11. In FIG. 11 it may be seen that the automatic post burn station of the present invention is primarily defined by vertical support members 201 and 202 which are positioned and supported by means of a transverse structural member 205 and by a bifurcated roller system including vertical supports 204 and 206. Batteries such as 218 pass along the roller system 203 for welding at the station, which welding occurs in a position under the welding assembly 213 as defined by stop roller 259. The assembly 213 includes a plurality of burning tips matable over the battery cover bushings of a battery such as 218. The assembly 213 is vertically movable by means of rods 214 and 216, bearing assemblies 248 and 249, a pair of counterweights 306 and 307, and an air cylinder and piston assembly 241 and 245.

As may be clearly understood from FIG. 11, the mechanism whereby a battery such as 218 is positioned for testing, and whereby other batteries are precluded from interfering with the testing process, is the use of upwardly pivotable rollers from the conveyor which thereby serve as stop mechanisms along the conveyor. Thus, under control of a cylinder 279 and a piston 281, through connections of lever arms 278 and 299 and tie rod 280, rollers 259 and 267 may be pivoted upwardly and over their next adjacent rollers, thereby forming a stop for batteries. Whenever air pressure in the cylinder 279 is increased, the piston 281 moves outwardly, along with tie rod 280 and rollers 259 and 267 again move downwardly to their normal positions. The batteries are then free to move down the conveyor.

Once a battery such as 218 is in abutment with the pivoted roller 259, as shown, two fingers 286 and 287 are pivoted upwardly and between the rollers, against the battery 218, and further until the battery 218 is locked into place in a predetermined position with respect to a horizontal axis transverse to the longitudinal axis of advancement of the batteries. The upward pivoting of fingers 286 and 287 occurs by means of yet another cylinder and piston arrangement 283, energized by means of appropriate control systems which will be more fully described herein.

Whenever the battery 218 is positioned as shown in FIG. 11, the welding assembly designated generally 213 will be lowered into place. This occurs chiefly by means of the cylinder 241 and the piston 245 arrangement which is connected to a shaft adaptor block 301 of the welding assembly designated generally 213. In order to facilitate this operation, the welding assembly designated generally 213 includes upwardly depending rods 214 and 216 which are connected, by means of lines 508 and 509, respectively, to a pair of counterweights 306 and 307. These counterweights are located conveniently within the upper portion of vertical support members 201 and 202. In preferred embodiments, the rods 214 and 216 pass through bearing assembly 248 and 249, and the lines 508 and 509 pass over pulleys located on cantilevered support arms 219 and 221. By means of the counterweights 506 and 507, the assembly designated generally 213 may also be kept in a nearly balanced condition, such that minimal force is necessary from the cylinder 241 and the piston 245 for either upward or downward movement. As seen in FIG. 11, the welding assembly designated generally 213 is comprised of a head means movable with respect to the frame of the apparatus along a vertical axis by means of the operation of the cylinder 241 and rod 245 as described above, and a mold means adjustably mounted on said head means for slidably engaging said head means along that vertical axis. The head means of the preferred embodiment of the present invention comprises air cylinder 241, cylinder rod 245, shaft adaptor block 301, shaft manifold rods 303 and 305, respectively, manifold block 307, carriage blocks 309 and 311, respectively, and upwardly depending rods 214 and 216. The mold means, which is adjustably mounted in said head means, is mounted on longitudinal supporting rod 313 extending between carriage blocks 309 and 311. The mold carriage blocks 315 and 317 act as the supporting structure for molds 319 and 321, which will be more fully described hereinafter. The apparatus shown in FIG. 11 illustrates the position wherein the head means is in its molding position by means of the full extension of rod 245, as indicated by the clearance of upwardly extending rods 214 and 216 and the space disposed between shaft adaptor block 301 and bearing assemblies 248 and 249. Upon activation of cylinder 241, which is a double-acting cylinder, the head means may be moved from the molding position as shown in FIG. 1 to a standby position wherein shaft adaptor block 301 is substantially contiguous to bearing assemblies 248 and 249. The burning means of the present invention is capable of selectively producing a flame for melting the battery elements to be fused, said burning means being mounted in slidable engagement along the vertical axis of movement of the head means, being slidably movable in that axis with respect to said head means. Hydraulic cylinder 323, which is a double-acting hydraulic cylinder, and rod 325, which is associated therewith, are actuatable to produce the movement of torch carriage 327 along the lower portions of manifold shafts 303 and 305. As may be seen in FIG. 11, locating template 329, similar in function to the locating template described above in other embodiments of the present invention, are provided on the torch carriage for precisely positioning the burning tips 228 and 233 within the longitudinal axis of advancement of the batteries along conveyor 203. As illustrated in FIG. 11, the torch carriage 327 is in the front burning position, as indicated by the close proximity between the burning tips 228 and 233 and the molds 219 and 321, respectively. Movement to the burning position has been produced by the extension of rod 325 in response to the activation of hydraulic cylinder 323. Not shown in FIG. 11, but important to the functioning of the torch carriage in a safe manner, is the provision of spring biased means extending between the manifold block 307 and the torch carriage designated generally 327, which spring biased means act to return the torch means to its pilot position in the event of power failure. In normal operation, however, the torch carriage is returned to its pilot position through activation of hydraulic cylinder 323, which causes the retraction of rods 325 and consequently draws torch carriage 327 towards manifold block 307, so that the torch carriage and manifold block are substantially contiguous to each other. In the burning position, as shown in FIG. 11, the trip bar 340 is shown engaging and depressing trip levers 341 and 342, which are attached to torches 343 and 344 respectively, and which trip levers act to control the intensity of the flame produced at burning tips 228 and 233 respectively. Oxygen and combustible gas are provided to torches 343 and 344 by means of gas supply line 345 and 346, which are in communication with suitable sources of oxygen and other combustible gases.

Figures 12, 13:
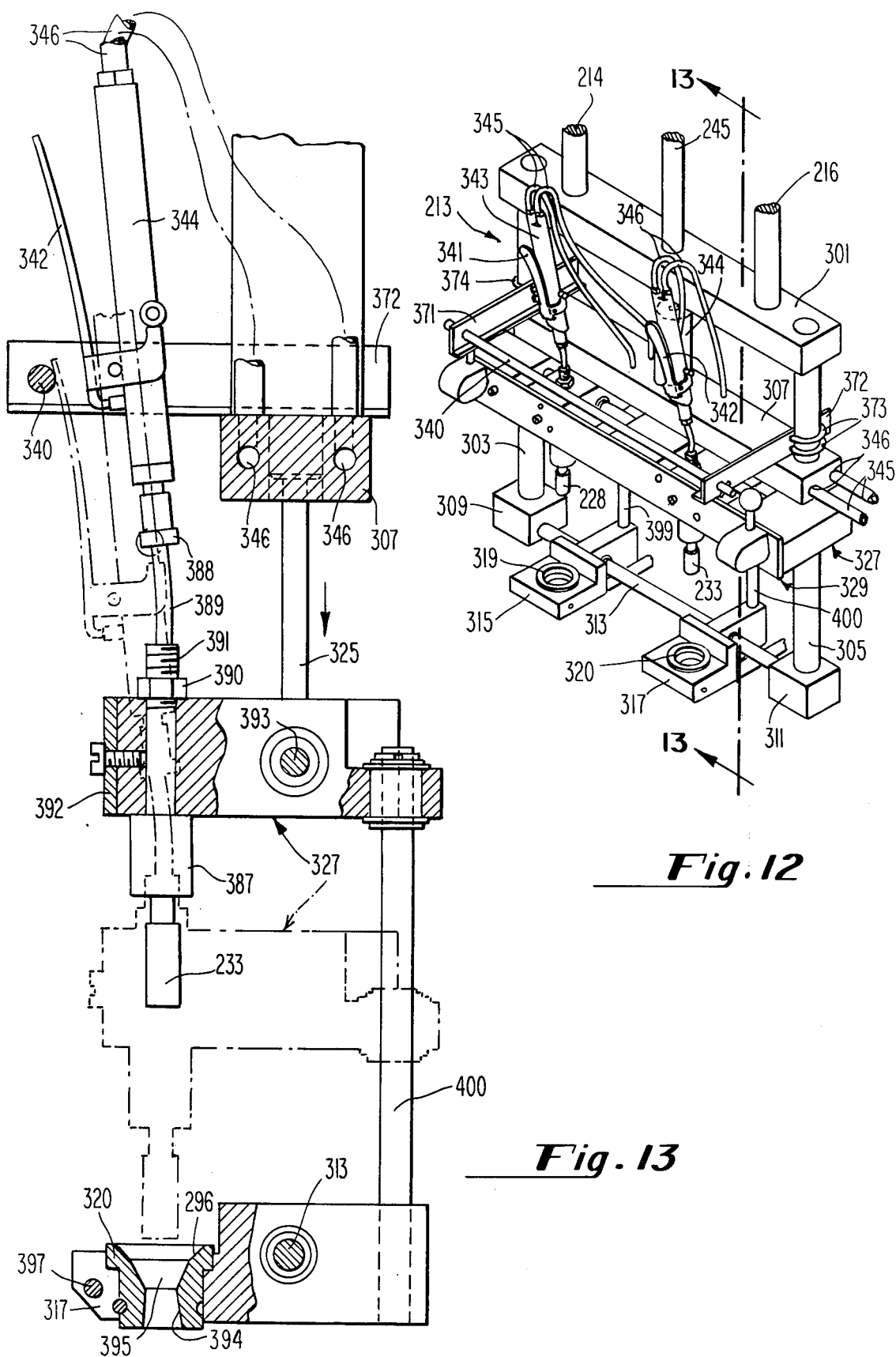
FIG. 12 is a perspective view of a portion of the molding and burning apparatus as illustrated in FIG. 11.
FIG. 13 is a greatly enlarged cross section of the portion of the apparatus shown in FIG. 12, taken as indicated by the lines and arrows 13—13 in FIG. 12.

Referring now to FIG. 12, which is a perspective view of the welding assembly designated generally 213, the operation of the preferred embodiment of the present invention can best be explained. As seen in FIG. 12, the torch carriage designated generally 327 is in its pilot position, at which time the flames emanating from burning tips 228 and 233 would be of the minimum intensity. Carriage blocks 315 and 317 are seen to be mounted in sliding engagement along a longitudinal axis on longitudinal bar 313, which is supported at either end by carriage blocks 309 and 311. Torches 343 and 344 are mounted at an acute angle with respect to the vertical axes of radial symmetry of burning tips 228 and 233 so that torch levers 341 and 342 are disposed over trip bar 340. L bracketss 371 and 372 are fixedly attached to manifold shafts 303 and 305 respectively by means of U bolts 373 and 374. Trip bar 340 is held in rotating engagement between L brackets 371 and 372 by means of cotter pins piercing said trip bar 340, which engagement allows trip bar 340 to rotate upon engagement with torch levers 341 and 342. As seen in FIGS. 12 and 13, as the torch carriage designated generally 327 moves from its pilot position to the burning position, as shown in phantom in FIG. 13, the torch 344 and torch lever 342 are brought down to engage the trip bar 340, shown in cross section in FIG. 13. Since the torch lever 342 is adapted to control intensity of the flame produced at the burning tip 233, it may be seen that as the torch carriage designated generally 327 moves in the direction of the arrow shown in FIG. 13 from the pilot to the burning position, the intensity of the flame produced at the burning tip 233 is correspondingly increased. As may clearly be seen in FIG. 13, the disposition of the burning tip 233 with respect to mold 320 allows the flame produced at burning tip 233 when the torch carriage is near the pilot position to preheat in a gentle manner the bushing and battery terminal posts which would normally be disposed within the mold 320 when the head means was in the molding position. The mold carriage block 317 which acts as a support for mold 320 is seen to have disposed therewithin at least one circulating chamber having cooling fluid 397 disposed therein for cooling the mold carriage block 317 during the molding process. Furthermore, the block itself is selected for its high heat transfer capacity, and is therefore composed of aluminum or other high heat transfer material. Similarly, and in direct opposition to the prior art teaching with respect to lead molds, the mold 320 is itself composed of aluminum or other high heat transfer material. As seen in FIG. 13, the engagement of mold 320 with mold carriage block 317 is tight, therefore allowing good heat transfer between these elements and cooling fluid 397 which is constantly being circulated therethrough. The interior surfaces 396, 395 and 394 of mold 320 have disposed thereon an aluminum oxide coating or, that is, the interior surfaces 394, 395 and 396 are anodized in order to create a thermal barrier between the mold void defined by the mold 320 and the solid aluminum which composes the mold.

The remainder of the apparatus of the head means and burning means may be seen in FIG. 13 to comprise vertical guide rods 399 and 400, which transversely align the mold 320 with the burning tip 233 as that burning tip moves from the pilot to the burning position. Longitudinal guide rod 393 for allowing longitudinal adjustment of the position of the burning tips with respect to the longitudinal axis of the batteries is seen in cross section in FIG. 13, as is a cut away portion of the torch carriage designated generally 327 to reveal conduit 392 having a threaded bushing 391 and 390 attached to tubing 389. Tubing 389 provides a gaseous conduit for the mixture of oxygen and combustible gas which is produced upon activation of the lever 342 within torch 344. Bushing means 388 are provided for interconnecting the tubing 389 with the torch 344. Along the lower surface of the torch carriage designated generally 327 and disposed between the torch carriage 327 and the burning tip 233 is seen to be a barrel on which the burning tip may easily removably be mounted. The gas supply conduit 346 is seen to be attached to the remote end of torch 344, enter and are disposed within manifold block 307, and are seen to emerge from manifold block 307 in FIG. 12, from whence they will be connected to suitable oxygen and combustible gas sources.

Figure 14:
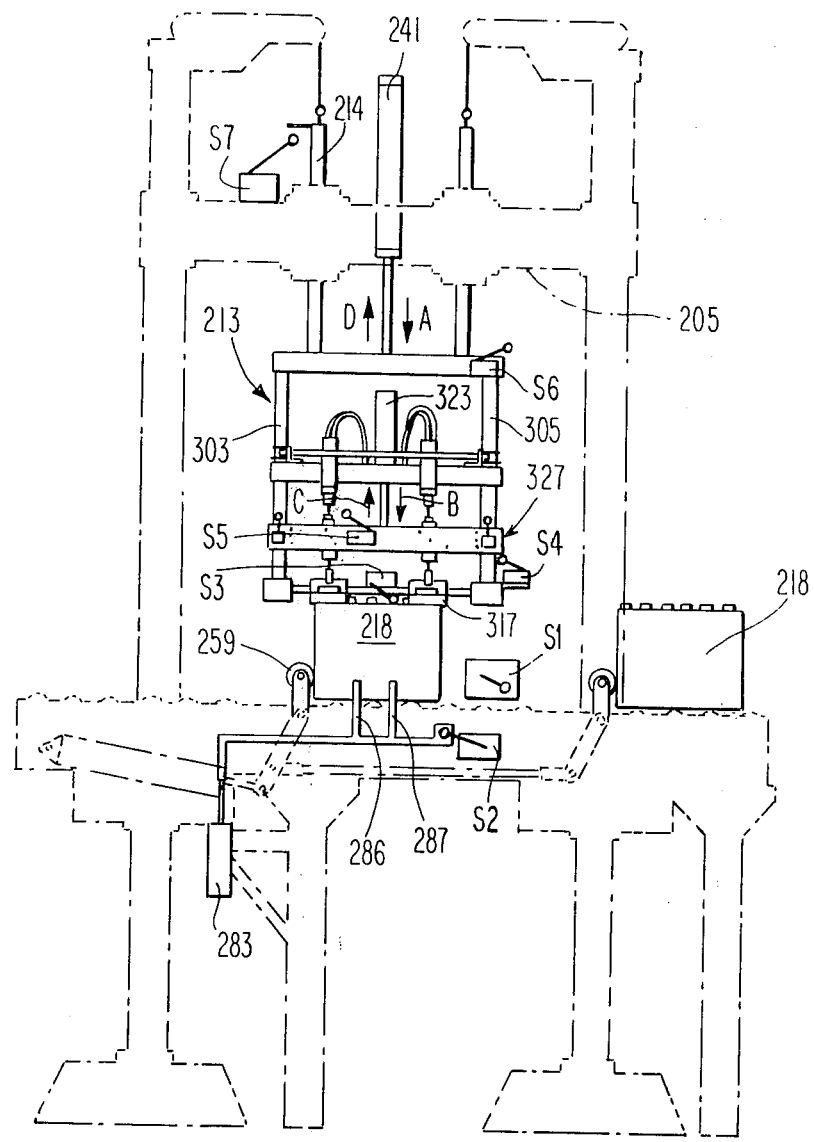
FIG. 14 is a schematic representation of the various sensing means of the preferred embodiment of the present invention shown in association with a front elevation of an apparatus in accordance with the preferred embodiment of the present invention, similar to that shown in FIG. 11.

Having described the apparatus of the preferred embodiment of the present invention, the operation of that apparatus in fusing battery cover bushings to battery terminal posts may be described as follows:

FIG. 14 is a schematic representation of the various sensing means of the preferred embodiment of the present invention shown in association with a front elevation of an apparatus in accordance with the preferred embodiment of the invention similar to that shown in FIG. 11. FIG. 14 shows and is intended to highlight the automated features of the preferred embodiment which, under normal operating conditions, will function entirely without an operator being present. The conveyor means in FIG. 214 is shown with the battery 218 in the fusing position. The battery 218 is brought into the fusing position by its introduction from the hold position, shown in phantom in FIG. 14 to its operating position. Upon the longitudinal advancement of the battery 218 from the hold position to the operating position, movable rollers are in the normal position, feed sensing means S1 shown in FIG. 14 is activated by the passage of the battery thereby. Consequently, the feed sensing means S1 is mounted on the apparatus for sensing the longitudinal advancement of a battery from the hold position towards the operating position, and for causing the stop means to move from the normal position which does not impede the longitudinal advancement of batteries to the stop position wherein batteries are held at the hold and operating positions. The feed sensing means further causes the delayed activation of clamp means comprising hydraulic cylinder 283 and fingers 286 and 287 which are pivoted upwardly and between the rollers against battery 218 and are further driven by cylinder 283 until battery 218 is locked into place in a predetermined position with respect to a horizontal axis transverse to the longitudinal axis of advancement of the batteries. In the preferred embodiment of the present invention the feed sensing means is adapted to activate the clamp means including cylinder 283 in a timed response interval which is between 0.2 and 5 seconds after the sensing of the passage of battery 218 from the hold to the operating position. This time delay interval is selected to allow battery 218 to abut roller 259 prior to the activation of the clamp means. Alignment sensing means S2 is provided to sense the full extension of fingers 286 and 287 either directly, or indirectly as shown in FIG. 14 by sensing the degree of rotation of a protrusion mounted on a shaft which rotation corresponds to the rotation of fingers 286 and 287. Once the alignment sensing means S2 determines the full movement of the clamp means to the fully clamped position, indicating that the battery has been forced from the operating to the fusing position, cylinder 241 is then activated to move the head means, which comprises the welding assembly designated generally 213 in the direction as indicated by arrow A. Since the battery 218 is in precise alignment with respect to the welding assembly 213, the mold carriage blocks 315 and 317, and the corresponding molds contained therein will matably encircle the battery bushing elements and battery post elements protruding from the top of battery 218. In the event that battery 218 has been removed from the apparatus or, in the event that no battery has been introduced into the apparatus due to machine malfunction, abort means S7 will be activated by the travel of the welding assembly, and particularly, by the travel of rod 214 beyond the normal molding position. Upon the activation of abort means S7 caused by the absence of a battery in the fusing position, the remaining portion of the operating cycle of the apparatus is then overridden, preventing the activation of the burning or torch carriage and causing the immediate return of the head means and welding assembly to the standby position, and further causing the stop means to move from the stop to the normal position so that the next battery may be introduced into the apparatus. If a battery, such as battery 218 shown in FIG. 14, is present when the welding assembly designated generally 213 moves from the standby to the molding position, battery sensing means S3 will sense the presence of a battery in the fusing position and will thereby activate hydraulic cylinder 323 to produce movement of the torch carriage 327 along the lower portions of manifold shafts 303 and 305. As hereinabove described, the burning means mounted on the torch carriage comprises lever means for contacting a trip member which automatically regulates the intensity of the flame from a minimum pilot flame when the burning means is in the pilot position to a maximum when the burning means is in the burn position as shown in FIG. 14. Consequently, the battery sensing means produces a movement of the torch carriage designated generally 327 in the direction as indicated by arrow B in FIG. 14 to a point as shown in FIG. 14 in the burning position wherein a maximum flame intensity is directed at the battery bushing element and battery post element encircled by each mold.

Upon movement of the torch carriage designated generally 327 to its fully extended burning position, a travel sensing means S4, which is mounted on the head means as shown in FIG. 14 senses the presence of the burning means in that burning position and causes the aforementioned hydraulic cylinder 323 to immediately begin moving the burning means back to the pilot position, as designated in FIG. 14 by arrow C. The aforementioned trip member and lever means respond to this retraction by reducing the intensity of the flame until, when the torch carriage reaches the pilot position, a return sensing means S5 which is mounted on the torch carriage designated generally 327 determines the return of the burning means to the pilot position and causes cylinder 241 to move the head means to the standby position as indicated by arrow D in FIG. 14 in timed response thereto. In the preferred embodiment of the present invention, cylinder 241 is activated by a delay interval of between 0.2 to 5 seconds, which time period creates a post chill time following the return of the torch carriage to the pilot position which is sufficient to allow at least partial solidification of the battery terminal posts. Activation of cylinder 241 to return the head means along the direction of arrow D shown in FIG. 14 causes the head means to return to the standby position. Reset sensing means S6 mounted on the head means, or alternatively, on the transverse structural member 205 senses and determines the movement of said head means to said standby position causing the stop means to move from the stop to the normal position, thereby allowing the passage of the battery which terminals were fused out of the fusing position while simultaneously allowing for the introduction of the next battery to be processed into the operating position as heretofore described. In order to facilitate this longitudinal advancement of batteries, the clamp means is similarly caused to move to the retracted position by the reset means S6 thereby causing fingers 286 and 287 to withdraw to the retracted position, thereby also resetting alignment sensing means S2.

As a result of the above description, it is apparent that the apparatus of the present invention is fully automated facilitating the rapid and reliable production of batteries incorporating high quality integrally fused battery terminals.

It will be understood that various changes in the details, materials and arrangement of parts which have been described and illustrated in order to explain the nature of this invention, may be made by those skilled in the art within the principle and scope of the invention as expressed in the appended claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

I claim:

1. An automated apparatus for sequentially forming integrally fused battery terminals on a plurality of storage batteries, each of which comprises at least one battery post element and adjacent battery bushing element, said apparatus comprising:

a. a frame,
   b. head means mounted on said frame movable along an axis with respect to said frame and having a trip member fixedly attached thereto, said head means being movable along said axis between standby and molding positions,
   c. mold means mounted on said head means and being adapted to matably encircle said battery elements when said head means is in the molding position,
   d. burning means capable of selectively producing a flame for melting said battery elements, said burning means being mounted for movement along said axis and with respect to said head means, between a first pilot and a second burning position, and said burning means further comprising a lever means for contacting said trip member for camming thereagainst, thereby automatically regulating the intensity of said flame from a minimum pilot flame when the burn means is in the pilot position to a maximum when the burn means is in the burn position.

2. The invention of claim 1 wherein said burning means further comprises a gas burner, a gas feed line, and a gas valve disposed in said feed line, and wherein said lever means comprises a lever connected to said gas valve, said lever camming against said trip member to control the gas flow through said valve, thereby regulating the intensity of said flame.

3. An automated apparatus for sequentially forming integrally fused battery terminals on a plurality of storage batteries, each of which comprises at least one battery post element and adjacent battery bushing element, said apparatus comprising:

a. a frame,
   b. head means associated with the frame and movable with respect to said frame along a first axis between standby and molding positions, said head means having mold means mounted thereon to matably encircle battery elements of a battery in a battery fusing position when said head means is in said molding position,
   c. burning means capable of selectively producing a flame for melting said battery elements when in a burning position, said burning means being mounted in slidable engagement along said first axis on said head means, for movement with respect to said head means between a first pilot and a second burning position.

4. The invention of claim 3 wherein said automated apparatus further comprises:

(a) conveyor means associated with said frame for advancing said batteries along an axis transverse with respect to said first axis, and
   (b) stop means associated with said conveyor means movable between a normal position wherein the advancement of said batteries along said transverse axis is unimpeded and a stop position for halting said batteries in each of at least two predetermined positions along said transverse axis, a first hold position and a second operating position.

5. The invention of claim 3 wherein said automated apparatus further comprises:
   (a) conveyor means associated with said frame for advancing said batteries along an axis transverse with respect to said first axis,
   (b) stop means associated with said conveyor means movable between a normal position wherein the advancement of said batteries along said transverse axis is unimpeded and a stop position for halting said batteries in each of at least two predetermined positions along said transverse axis, a first hold position and a second operating position, and
   (c) clamp means associated with said conveyor means movable between a retracted position and a clamped position for forcing each of said batteries along a third axis into a battery element fusing position with respect to said first axis.

6. The invention of claim 4 wherein said automated apparatus further comprises an abort means associated with said head means for determining the absence of a battery in said battery operating position when said head means is in the molding position; said abort means causing said head means to move to said standby position in response to said determination.

7. The invention of claim 6 wherein said abort means further causes said stop means to move to said normal position in response to said determination.

8. The invention of claim 4 wherein said automated apparatus further comprises a feed sensing means associated with said conveyor means for sensing the advancement of a battery from said hold position toward said operating position along said transverse axis, and for causing said stop means to move from said normal position to said stop position in response thereto.

9. The invention of claim 5 wherein said automated apparatus further comprises a feed sensing means juxtaposed to said conveyor for sensing the advancement of a battery from said hold position toward said operating position along said transverse axis, and for causing said stop means to move from said normal position to said stop position in response thereto, said feed sensing means further causing the movement of said clamp means from said retracted to said clamped position in timed response to said sensing of the advancement of a battery.

10. The invention of claim 9 wherein said timed response occurs between 0.2 and 5 seconds after said sensing.

11. The invention of claim 5 wherein said automated apparatus further comprises an alignment sensing means associated with said clamp means for determining the movement of said claims means to said clamped position, said alignment sensing means further causing said head means to move from said standby to said molding position in response to said determination.

12. The invention of claim 11 wherein said alignment sensing means is mounted on said conveyor means.

13. The invention of claim 3 wherein said apparatus further comprises a battery sensing means for sensing the presence of a battery in the fusing position when said head is in the molding position, and for causing said burning means to move from said pilot to said burning position in response thereto.

14. The invention of claim 3 wherein said automated apparatus further comprises a travel sensing means associated with said burning means for determining the presence of said burning means in said burning position and for causing said burning means to move to said pilot position in response to said determination.

15. The invention of claim 3 wherein said automated apparatus further comprises a return sensing means associated with said burning means for determining the return of said burning means to said pilot position and for causing said head means to move to said standby position in delayed response to said determination.

16. The invention of claim 15 wherein said delayed response is of sufficient duration to allow said battery elements melted by said burning means to at least partially solidify.

17. The invention of claim 16 wherein said delayed response is from 0.2 to 5 seconds in duration.

18. The invention of claim 4 wherein said automated apparatus further comprises a reset sensing means associated with said head means for determining the movement of said head means to said standby position and for causing said stop means to move to said normal position in response to said determination.

19. The invention of claim 5 wherein said automated apparatus further comprises a reset sensing means associated with said head means for determining the movement of said head means to said standby position and for causing said clamp means to move to the retracted position in response to said determination.

20. The invention of claim 3 wherein said mold means has disposed on at least one of the surfaces thereof an aluminum oxide mold coating.

21. The invention of claim 20 wherein said mold means is composed of aluminum having at least one anodized molding surface disposed thereon.

* * * * *